United States Patent [19]

Gotoh et al.

[11] Patent Number: 5,337,302
[45] Date of Patent: Aug. 9, 1994

[54] OPTICAL DATA RECORDING/REPRODUCTION APPARATUS FOR USE WITH SEMICONDUCTOR LASERS AS A LIGHT SOURCE

[75] Inventors: Hiroshi Gotoh, Kawasaki; Masami Emoto; Kiyoshi Yokomori, both of Yokohama, all of Japan

[73] Assignee: Ricoh Company, Ltd., Tokyo, Japan

[21] Appl. No.: 93,974

[22] Filed: Jul. 13, 1993

Related U.S. Application Data

[63] Continuation of Ser. No. 797,154, Nov. 26, 1991, abandoned, which is a continuation of Ser. No. 613,950, Nov. 13, 1990, abandoned, which is a continuation of Ser. No. 28,043, Mar. 20, 1987, abandoned, which is a continuation of Ser. No. 712,656, Mar. 18, 1985, abandoned.

[30] Foreign Application Priority Data

Mar. 19, 1984 [JP] Japan .................................. 59-51089

[51] Int. Cl.$^5$ .............................................. G11B 7/00
[52] U.S. Cl. .................................. 369/112; 369/44.23; 369/122

[58] Field of Search ................. 369/43, 106, 112, 122, 369/44.11, 44.14, 44.23, 44.24, 44.41; 350/474; 250/201.5

[56] References Cited

U.S. PATENT DOCUMENTS 4,397,527 8/1983 Geyer ........................... 369/112 X
4,532,619 7/1985 Sugiyama et al. ................. 369/106

OTHER PUBLICATIONS

"Disc-Type Still-Video Recorder" by Kanamaru et al. of National Technical Report, vol. 28, No. 3, Jun. 1982, pp. 87-98.
"Semiconductor Laser and Usage thereof" by Kunio Aiki of O plus E, Feb. 1984, pp. 89-97.

*Primary Examiner*—W. R. Young
*Attorney, Agent, or Firm*—Oblon, Spivak, McClelland, Maier & Neustadt

[57] ABSTRACT

An optical data recording and reproduction apparatus which uses a semiconductor laser as a light source is disclosed. The half angle of light issuing from the laser in a junction direction of the laser and the focal length of a condenser lens adapted to focus a laser beam from the laser are adequately selected in such a manner as to satisfy a particular condition.

3 Claims, 5 Drawing Sheets

OPTICAL DATA RECORDING/REPRODUCTION APPARATUS FOR USE WITH SEMICONDUCTOR LASERS AS A LIGHT SOURCE

This application is a continuation of application Ser. No. 07/797,154, filed on Nov. 26, 1991, now abandoned, which was a continuation of application Ser. No. 07/613,950,filed on Nov. 13, 1990, now abandoned which was a continuation of application Ser. No. 07/028,043, filed on Mar. 20, 1987, now abandoned which was a continuation of application Ser. No. 06/712,656, filed on Mar. 18, 1985, now abandoned.

BACKGROUND OF THE INVENTION

The present invention relates to an optical data recording and reproduction apparatus and, more particularly, to an optical data recording and reproduction apparatus of the type using a semiconductor laser as a light source.

A predominant light source in the optical data recording and reproduction art is a semiconductor laser which is small in size and low in cost. The output power of a semiconductor laser necessary for recording data is about ten times greater than one necessary for reproduction. One approach heretofore proposed to ensure such output power for recording is increasing the numerical aperture, or NA, of a condenser lens, which is adapted to focus a beam issuing from a semiconductor laser. Specifically, the numerical aperture of a lens and the coupling efficiency η, or a ratio of light focused to parallel rays by the lens, are generally related as shown in FIG. 1. Optical pickups exclusively used for reproduction or playback purposes are usually implemented by condenser lenses whose numerical apertures are not greater than 0.2, i.e. 0.13–0.17. Although such numerical apertures are reflected by coupling efficiencies n as low as 20–30%, they offer sufficient allowances concerning the amount of light because of the exclusive use of the pickups for playback. While an increase in the light output may be accomplished by increasing the numerical aperture of a lens in order to provide an optical pickup with a recording capability as well as the playback capability, it cannot exceed a certain limit in consideration of the accuracy with which the lens should be mounted to a light source and the like. It is necessary, therefore, to enhance the output power of a semiconductor laser itself which functions as a light source.

An ordinary optical recording and reproduction apparatus using a semiconductor laser is shown in FIG. 2 and generally designated by the reference numeral 10. As generally accepted, the half angle $\theta_H$ of light issuing from a semiconductor laser 12 in a direction parallel to the junction direction of the laser lies in the range of 6–40 degrees. The current trend in the optical recording and playback art is to the use of a laser whose half angle $\theta_H$ is not greater than 10 degrees, so far as the high output power semiconductor laser 12 is concerned. If the half angle $\theta_H$ is small, a parallel beam passed through a condenser lens 14 will have a small diameter $\Phi_c$ and, therefore, a spot projected by an objective lens 16 onto a recording medium 18 will have its diameter increased relatively. The increase in the spot diameter at the recording medium 18 naturally results in inaccurate recording or playback.

In light of the above, it has been customary to interpose between the coupling lens 14 and the objective lens 16 beam trimming optics which includes, for example, a plano-concave cylindrical lens 20 and a plano-convex cylindrical lens 22, so that the beam diameter $\Phi_c$ is increased to in turn reduce the spot diameter. In FIG. 2, designated by the reference numeral 24 is a polarizing beam splitter, 26 a quarter-wave plate, and 28 a light receiving element for receiving light reflected by the recording medium 18.

The beam trimming, however, causes the objective 16 to limit the beam and, thereby, brings about a loss of quantity of light by 30–40% compared to a non-trimming condition. To compensate for the loss, a system featuring both the recording and playback capabilities has to be furnished with a semiconductor laser which produces much greater output power, at the cost of an expensive design of the whole apparatus.

SUMMARY OF THE INVENTION

It is therefore an object of the present invention to provide an economical optical data recording and reproduction apparatus which has a simple construction, entails a minimum of loss in the quantity of light, and records and reproduces data with accuracy.

It is another object of the present invention to provide a generally improved optical data recording and reproduction apparatus.

An optical data recording and reproduction apparatus of the present invention comprises a semiconductor laser functioning as a light source, a condenser lens for condensing a beam issuing from the semiconductor laser to provide a parallel beam, an objective lens for focusing the parallel beam incident thereto to a small spot at a recording medium which has tracks thereon, and an element for detecting a track position associated with the small spot in response to light which is reflected by the recording medium. There holds a relation $$f_c \cdot \sin(\theta_H/2)/ f_o \cdot NA_o \geq 0.5$$

where $f_c$ is a focal length of the condenser lens, $\theta_H$ is a half angle of light issuing from the semiconductor laser in a direction parallel to a junction plane of the semiconductor laser, and $f_o$ and $NA_o$ respectively are a focal length and a numerical aperture of the objective lens.

In accordance with the present invention, an optical data recording and reproduction apparatus which uses a semiconductor laser as a light source is disclosed. The half angle of light issuing from the laser in a junction direction of the laser and the focal length of a condenser lens adapted to focus a laser beam from the laser are adequately selected in such a manner as to satisfy a particular condition.

The above and other objects, features and advantages of the present invention will become apparent from the following detailed description taken with the accompanying drawings.

DESCRIPTION OF THE PREFERRED EMBODIMENT

While the optical data recording and reproduction system of the present invention is susceptible of numerous physical embodiments, depending upon the environment and requirements of use, a substantial number of the herein shown and described embodiment have been made, tested and used, and all have performed in an eminently satisfactory manner.

Figure 1:
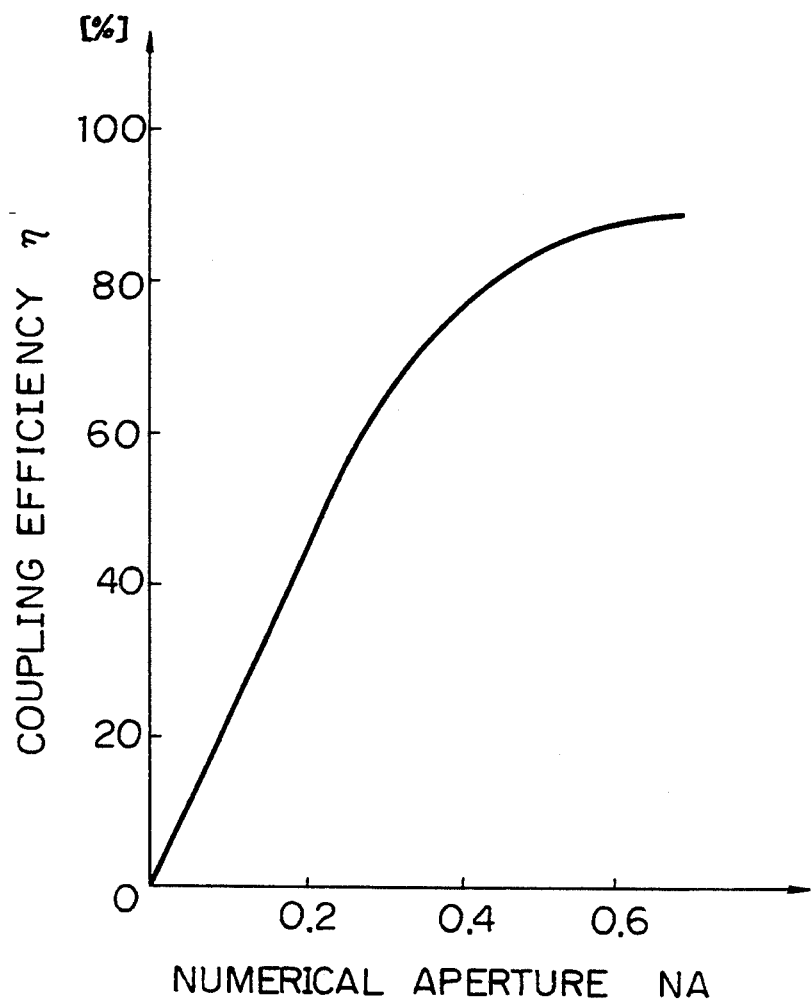
FIG. 1 is a graph showing a relationship between a numerical aperture of a lens and a coupling efficiency.
Figure 2:
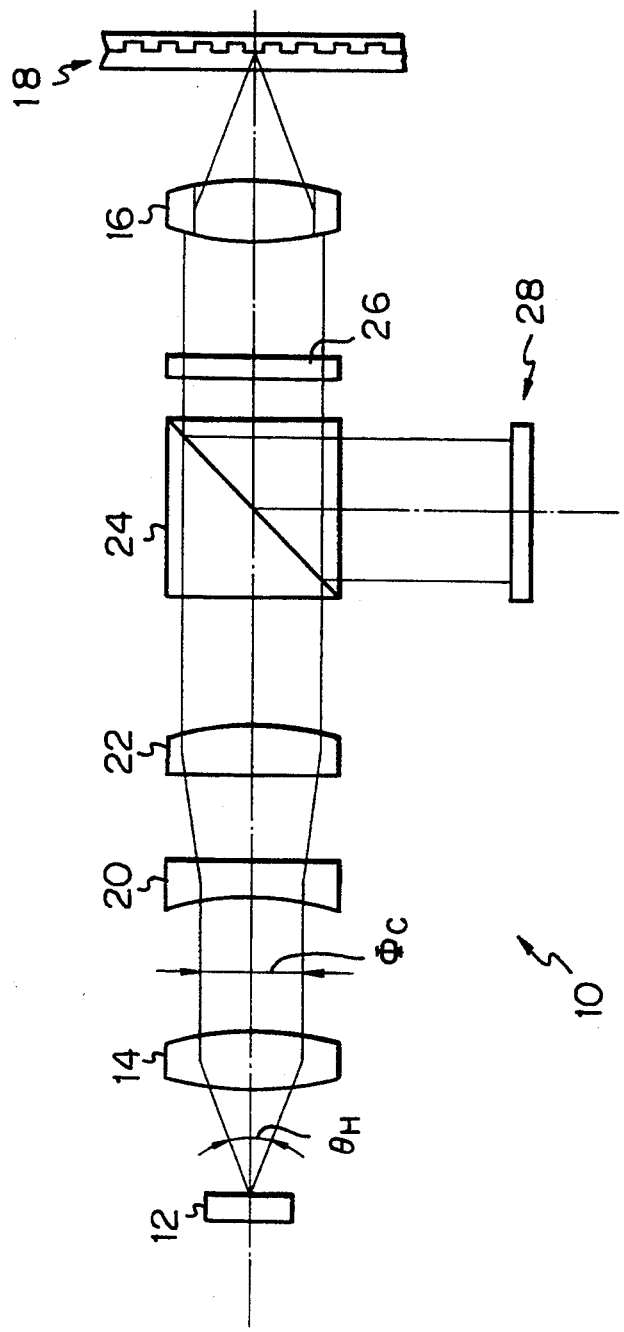
FIG. 2 is a schematic view of a prior art optical data recording and reproduction apparatus.
Figure 3:
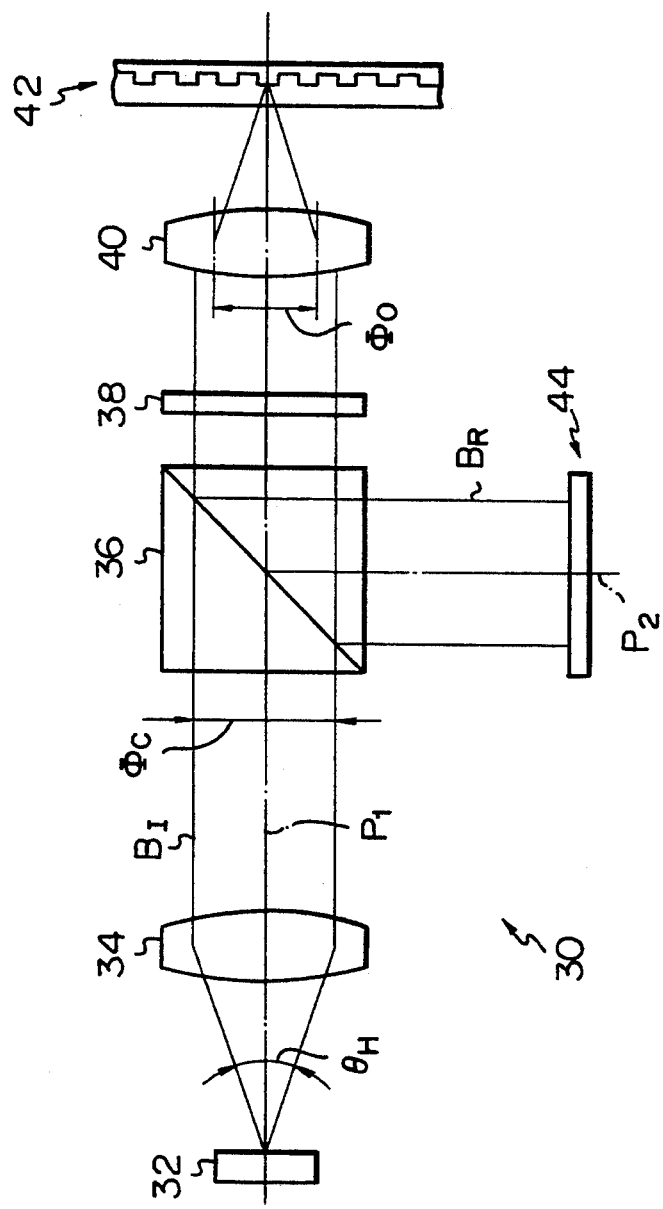
FIG. 3 is a schematic view of an optical data recording and reproduction apparatus embodying the present invention.

Referring to FIG. 3 of the drawings, an optical data recording and reproduction apparatus in accordance with the present invention is shown. The system, generally 30, includes a semiconductor laser 32 which is electrically connected to a recording system (not shown), into which data will be entered, so as to emit a laser beam responsive to a data signal. Let $\theta_H$ be the half angle of the laser beam issuing from the laser 32 with respect to the junction direction. A coupling lens 34 is positioned next to the laser 32 in the emission direction in order to focus the issuing laser beam to a parallem beam $B_I$. Advantageously, the coupling lens 34 has a numerical aperture $NA_c$ which is larger than one in an apparatus designed exclusively for playback purposes and, in this particular embodiment, it is selected to be 0.2 or more. Assuming that the focal length of the coupling lens 34 is $f_c$, the focused parallel beam $B_I$ has a diameter $\Phi_c$ expressed as:

$$\Phi_c = 2 \cdot f_c \cdot \sin(\theta_H/2) \qquad \text{Eq. (1)}$$

Figure 4:
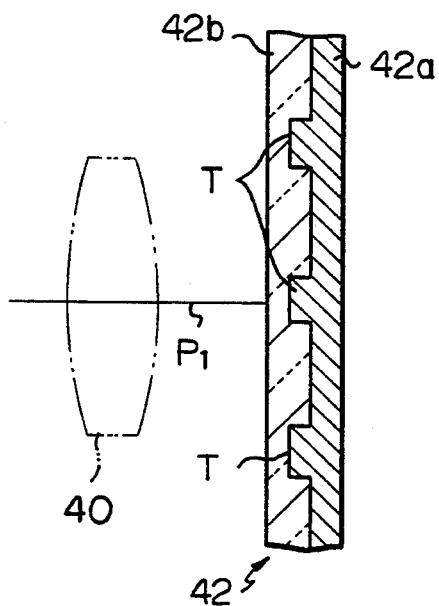
FIG. 4 is a fragmentary section of an optical disc applicable to the apparatus of the present invention.

A polarizing beam splitter 36 and a quarter-wave plate 38 are arranged in sequence along an optical axis $P_1$ at the downstream of the coupling lens 34 with respect to the emission direction. Located on the optical axis $P_1$ downstream of the quarter-wave plate 38 are an objective lens 40 and an optical disc 42 which are spaced a predetermined distance from each other. The disc 42 serves as a recording medium. The objective lens 40 converges the parallel beam $B_I$ to a spot and projects it onto the disc 42. In this case, the effective aperture, $\Phi_o$, of the objective 40 is produced by:

$$\Phi_o = 2 \cdot f_o \cdot NA_o \qquad \text{Eq. (2)}$$

where $NA_o$ is a numerical aperture of the objective 40 and $f_o$ a focal length of the same. Generally, the effective aperture $\Phi_o$ is about 4.35. As shown in FIG. 4, the disc 42 includes a recording medium portion 42a which is provided with a plurality of spaced tracks T on its surface which faces the objective 40. The disc surface with the tracks T is covered by a transparent substrate 42b. The disc 42 with such a configuration is generally oriented such that tracks T extend perpendicular to the junction direction of the laser 32.

Meanwhile, an at least bisected light receiving element 44 is located on an optical axis $P_2$ which extends from the beam splitter 36 perpendicular to the optical axis $P_1$. In this instance, the splitting direction of the element 44 is predetermined to be parallel to the direction of extension of the tracks T on the disc 42. In this construction, a beam $B_R$ returning from the disc 42 is passed through the objective 40 to the quarter-wave plate 38 to have its polarization plane varied thereby, and then separated by the beam splitter 36 from the incoming parallel beam $B_I$ to become incident to the split light receiving element 44. In the illustrative embodiment, a track signal representative of a track position is provided by a difference signal indicative of a difference between the quantities of light incident to split elements 44a and 44b, while a data signal is provided by a sum signal indicative of a sum of the same.

Figure 5A:
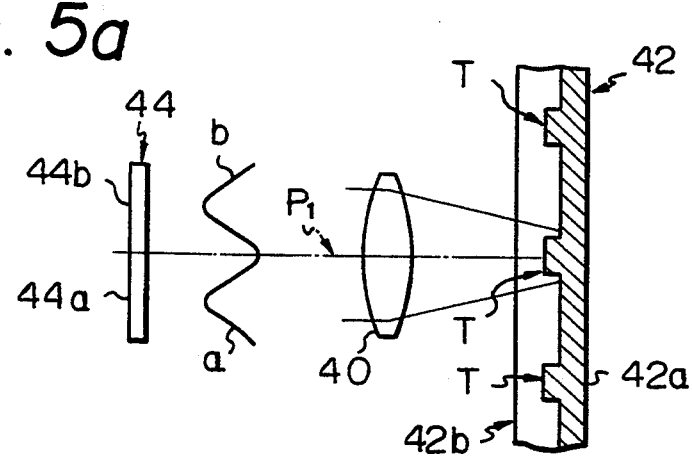
FIGS. 5a through 5c are views representative of track detection principles.
Figure 5B:
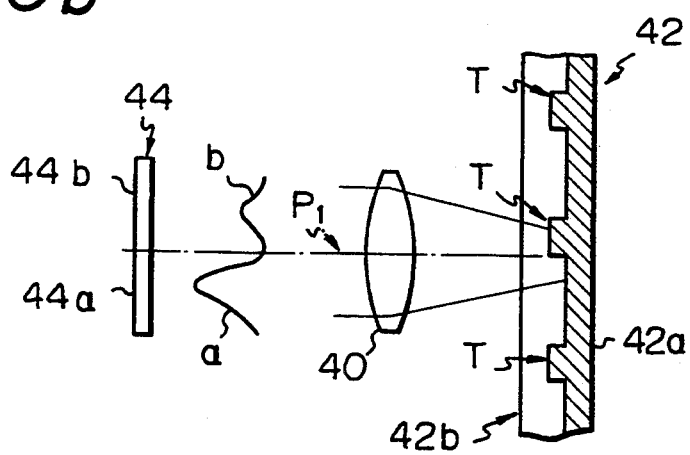
Figure 5C:
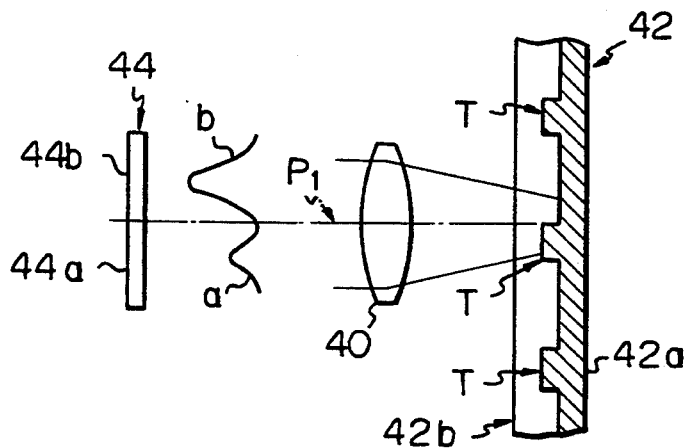

Reference will be made to FIGS. 5a through 5c for describing the track signal detection principles. As shown in FIG. 5a, where the optical axis $P_1$ of the focused beam issuing from the objective 40 is incident to the center of a track T on the disc 42, that is, while the tracking condition is adequate, the beam reflected by the disc 42 will be directed to the split elements 44a and 44b by equal quantities. This allows the elements 44a and 44b to receive the same quantities of reflected light a and b and, thereby, maintains the signal representative of a difference, a−b, zero level. Such a signal indicates that adequate tracking is under way.

If the optical axis $P_1$ is dislocated to the left in the drawing with respect to the center of the track T, as shown in FIG. 5b, the quantity of light a received by the element 44a will be greater than the quantity b received by the other element 44b and, so, the resulting difference signal, a−b, will be of a positive value, for example. Conversely, if the optical axis $P_1$ is shifted to the right as shown in FIG. 5c, the quantity b will be larger than the quantity a resulting in a difference signal of a negative value.

As described above, a track signal is provided in terms of a difference between the quantities of light received by the split elements 44a and 44b, while a tracking control is executed by bodily moving the whole pickup except for the objective 40 or the disc 42 in response to the track signal. In this instance, a track position detecting accuracy of 0.1 microns or less is required.

Besides the track position control mechanism stated above, a control mechanism (not shown) is used to control the position of the focus of the incident beam $B_I$ in response to a focus detection signal. This control mechanism associated with the focus controls the position of the focus with an accuracy as high as ±1 micron or less.

In accordance with the present invention, an accurate track signal is attained with a minimum of loss in the quantity of light by means of a unique construction which will be described hereinafter. To accomplish an accurate track signal, it is a prerequisite that the spot of the incident beam $B_I$ projected onto the disc 42 be reduced in diameter. The spot diameter depends upon the diameter $\Phi_c$ of the parallel beam incident to the objective 40 as previously mentioned (precisely, a half width of the beam $B_I$ which substantially shows a Gaussian distribution) and an effective aperture $\Phi_o$ which is a characteristic value particular to the objective 40.

Figure 6:
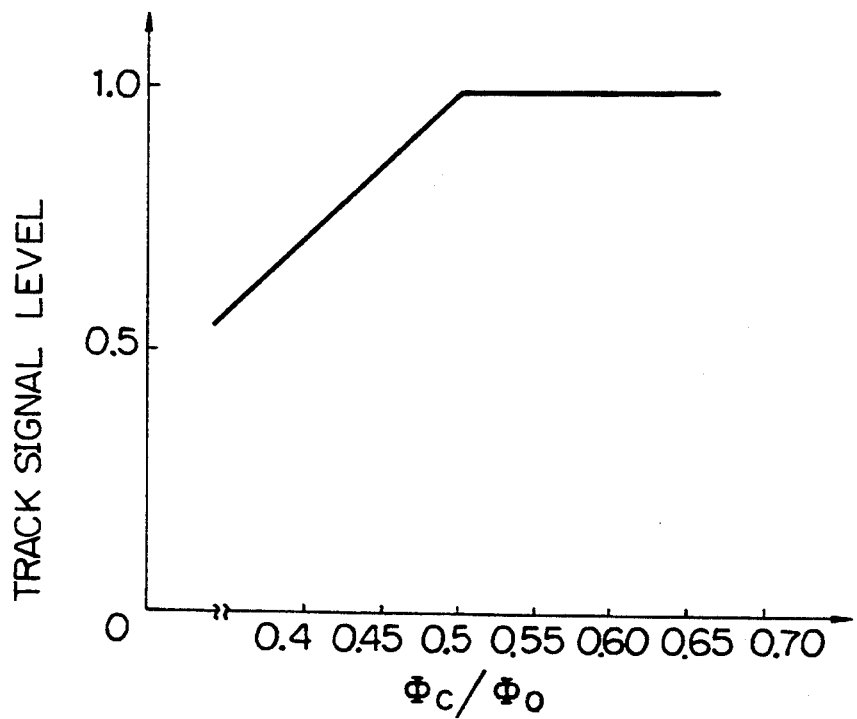
FIG. 6 is a graph showing & relationship between a ratio $\Phi_c/\Phi_o$ and a track signal level.

With the above in view, tests were conducted to determine a relationship between the ratio $\Phi_c/\Phi_o$ and the track signal level. The results of the tests are shown in FIG. 6, in which the abscissa shows the ratio $\Phi_c/\Phi_o$ and the ordinate, the value indicative of a track signal level relative to a predetermined reference value. It will be understood from the graph that the track signal level increases with the ratio $\Phi_c/\Phi_o$, i.e. parallel beam diameter $\Phi_c$, and merges into a desired stable level when $\Phi_c/\Phi_o > 0.5$ has been reached.

It follows that if half angle $\theta_H$ of light issuing from the laser 32, the focal length $f_c$ of the coupling lens 34, and the focal length $f_o$ of the objective lens 40, which dictates the effective aperture $\Phi_o$ of the objective 40, as well as the numerical aperture $NA_o$ are selected so that the following equation may be derived from the Eqs. (1) and (2):

$$\frac{\Phi_c}{\Phi_o} = \frac{f_c \cdot \sin(\theta_H/2)}{f_o \cdot NA_o} \geq 0.5 \qquad \text{Eq. (3)}$$

highly reliable track signals will be attained without the need for special beam trimming optics and with a minimum of loss in the quantity of light.

For example, since the effective aperture $\Phi_o$ of the objective 40 is usually about 4.35, there holds $\theta_H > 17°$ when the focal length $f_c$ of the coupling lens 34 is 7 millimeters, $\tau_{4H} > 14°$ when the focal length $f_c$ is 9 millimeters, and $\theta_H \geq 11°$ when the focal length $f_c$ is 11 millimeters, each satisfying the Eq. (3) and, thereby, ensuring accurate track signals.

In summary, it will be seen that the present invention provides an optical data recording and reproduction apparatus which achieves high track signal levels if only the half angle of light issuing from a semiconductor laser and the focal length of a condenser lens adapted to focus the laser beam are adequately predetermined in such a manner as to satisfy a particular condition. That is, in accordance with the present invention, an optical data recording and reproduction apparatus capable of recording and reproducing data accurately and efficiently with a minimum of light amount loss can be produced without resorting to beam trimming optics.

Various modifications will become possible for those skilled in the art after receiving the teachings of the present disclosure without departing from the scope thereof.

What is claimed is:

1. An optical data recording and reproducing apparatus comprising:
    a semiconductor laser functioning as a light source;
    a single condenser lens having a numerical aperture NAc of 0.2 or more for condensing a beam issuing from said semiconductor laser to provide a parallel beam;
    a single objective lens for focusing the parallel beam incident thereto a small spot at a recording medium which has tracks thereon;
    a single beam splitter interposed between said single objective lens and said single condenser lens for splitting the light reflected by the recording medium;
    a quarter-wave plate located between said beam splitter and said single objective lens; and
    means for detecting a track position associated with said small spot in response to light which is reflected by the recording medium placed in the beam provided by said beam splitter, there holding a relation:

$$f_c \cdot \sin(\theta_H/2)/f_o \cdot NA_o \geq 0.5$$

where $f_c$ is a focal length of the condenser lens, $\theta_H$ is a half angle of light issuing from the semiconductor laser in a direction parallel to a junction plane of the semiconductor laser, and $f_o$ and $NA_o$ respectively are a focal length and a numerical aperture of the objective lens and wherein no optical elements save for said single condenser lens, said single objective lens said quarter-wave plate and said single beam splitter shape said beam.

2. An optical data recording and reproducing apparatus having a single condenser lens which has a numerical aperture NAc of 0.2 or more for condensing a beam issuing from a semiconductor laser as a light source to provide a parallel beam, said apparatus comprising:
    a single objective lens for focusing the parallel beam incident thereto a small spot at a recording medium which has tracks thereon;
    a single beam splitter interposed between said single objective lens and said single condenser lens for splitting the light reflected by the recording medium;
    a quarter-wave plate located between said beam splitter and said single objective lens and
    detecting means for detecting a track position associated with said small spot in response to light which is reflected by the recording medium placed in the beam provided by said beam splitter, there holding a relation:

$$f_c \cdot \sin(\theta_H/2)/f_o \cdot NA_o \geq 0.5$$

where $f_c$ is a focal length of the condenser lens, $\theta_H$ is a half angle of light issuing from the semiconductor laser in a direction parallel to a junction plane of the semiconductor laser, and $f_o$ and $NA_o$ respectively are a focal length and a numerical aperture of the objective lens and wherein no optical elements save for said single condenser lens, said single objective lens, said quarter-wave plate and said single beam splitter shape said beam.

3. In an optical data recording and reproducing apparatus comprising a semiconductor laser functioning as a light source, a condenser lens having a numerical aperture NAc of 0.2 or more for condensing a beam issuing from said semiconductor laser to provide a parallel beam, an objective lens for focusing the parallel beam incident thereto a small spot at a recording medium which has tracks thereon, a beam splitter interposed between said objective lens and said condenser lens for splitting the light reflected by the recording medium, a quarter wave plate located between said objective lens and said beam splitter, and means for detecting a track position associated with said small spot in response to light which is reflected by the recording medium placed in the beam provided by said beam splitter, the improvement wherein there holds a relation $$f_c \cdot \sin(\theta_H/2)/f_o \cdot NA_o \geq 0.5$$

where $f_c$ is a focal length of the condenser lens, $\theta_H$ is a half angle of light issuing from the semiconductor laser in a direction parallel to a junction plane of the semiconductor laser, and $f_o$ and $NA_o$ respectively are a focal length and a numerical aperture of the objective lens and wherein no optical elements save for said condenser lens, said objective lens, said quarter wave plate and said beam splitter shape said beam.

* * * * *